(No Model.)  G. G. WARD.  2 Sheets—Sheet 1.
VEHICLE WHEEL.

No. 471,781.  Patented Mar. 29, 1892.

WITNESSES:
R. M. Russell
F. Norman Dixon

George G. Ward.
INVENTOR
By his Attorneys, (No Model.) 2 Sheets—Sheet 2.

G. G. WARD.
VEHICLE WHEEL.

No. 471,781. Patented Mar. 29, 1892.

WITNESSES:
R. M. Russell
F. Norman Dixon

George G. Ward
INVENTOR
By his Attorneys

UNITED STATES PATENT OFFICE.

GEORGE G. WARD, OF CAMDEN, NEW JERSEY.

VEHICLE-WHEEL.

SPECIFICATION forming part of Letters Patent No. 471,781, dated March 29, 1892.

Application filed October 14, 1891. Serial No. 408,659. (No model.)

*To all whom it may concern:*

Be it known that I, GEORGE G. WARD, a citizen of the United States, residing in Camden, in the county of Camden, and State of New Jersey, have invented certain new and useful Improvements in Vehicle Wheels, of which the following is a specification.

My invention relates to the wheels employed upon various types of road vehicles and especially to the class in which the spokes and felly are under the actuation of devices forming part of the hub capable of expansion radially with respect to the hub to press the felly firmly against the tire,—and its object is to provide a hub which while operative as above set forth shall be of a novel form and arrangement less expensive in construction and consisting of a less number of parts than such hubs as heretofore manufactured.

Figure 1:
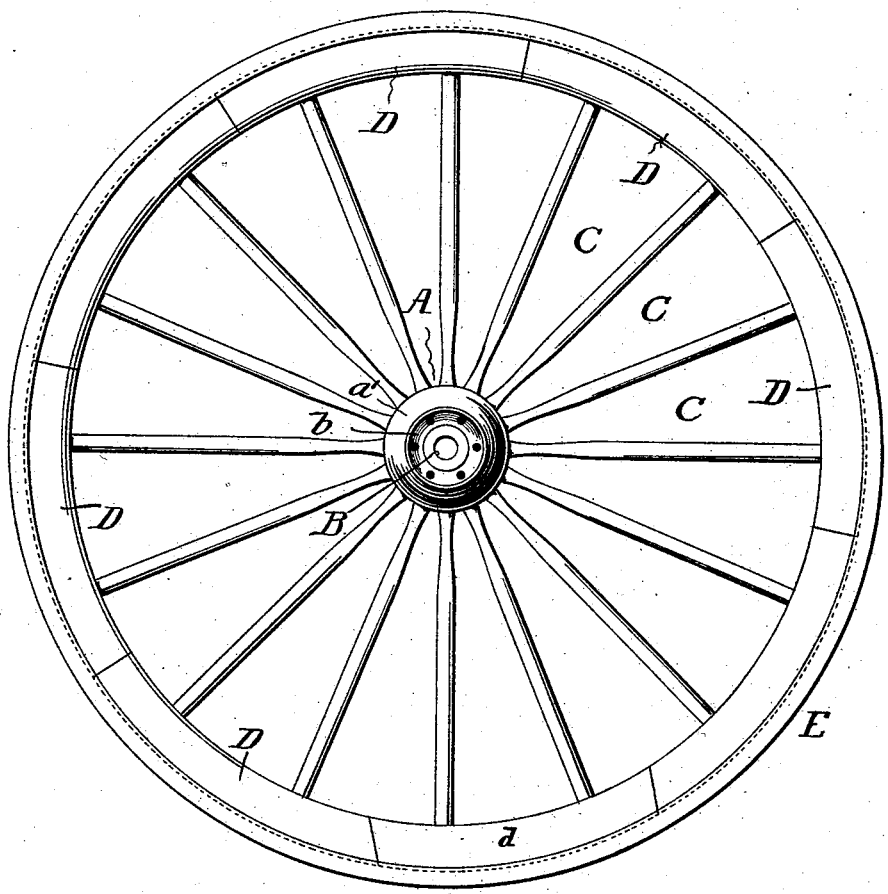
Figure 2:
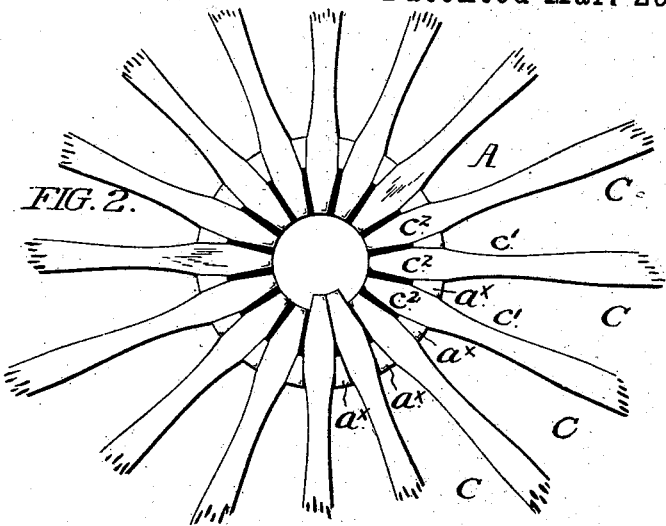
Figure 3:
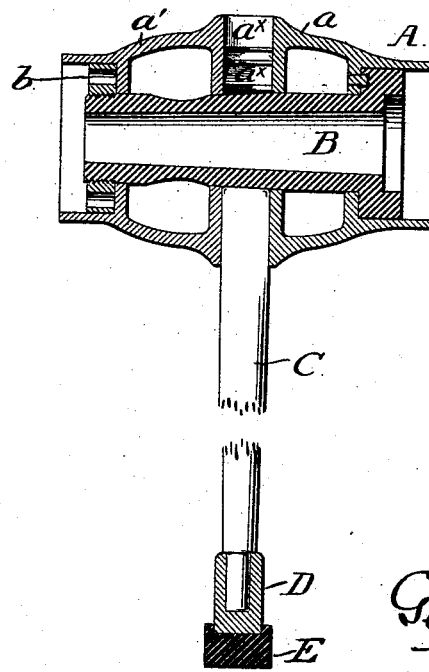

In the drawings, Figure 1 is a view in side elevation of a wheel embodying my invention. Fig. 2 is a side elevational view of the hub body and inner portion of the spokes set therein. Fig. 3 is a central vertical longitudinal sectional elevation of the hub with one spoke in place therein, the felly and the tire being shown in transverse section.

Similar letters of reference indicate corresponding parts.

Generally stated, my invention comprehends a vehicle wheel consisting of a tire equipped with two lateral inwardly extending radial flanges, a felly formed in sections into each of which is entered an appropriate number of spokes, and a sectional metal hub socketed to receive the spokes,—the whole being so arranged than when, in the putting together of the wheel as an entirety, the hub is placed in position within the circle of the tire, and the spokes of the respective felly sections engaged with the hub, (the felly sections themselves set in position between the tire flanges) all the parts may be permanently locked in position by a bushing casting which passes through the hub, and serves to radially expand the spokes and felly sections with respect to the tire.

The wheel hub A is made in two parts, one of which I term the body $a$, and the other the cap $a'$, the line of division between the two coinciding with the radial plane of the outer lateral edges of the spoke sockets. These two parts which are preferably of metal and conveniently of the form shown, are united by the hollow bushing casting B, which serves the purpose of a connecting bolt. The outer end of the body $a$ is equipped with a number of web-like projections, $a^x$, the interspaces between which are adapted to receive the inner ends of the spokes and constitute, when inclosed by the cap $a'$, the spoke sockets. These webs are preferably wedge-shaped, tapering from their outer edges to their inner, and are radially disposed in a concentric series. C are the spokes, each of which at a point near its inner end is preferably diminished in diameter for a short distance so as to form a neck $c'$ and a head $c^2$. The neck of the spoke is thereby adapted to enter laterally within the socket between two webs $a^x$ of the hub body $a$, and the spoke to be forced longitudinally outward away from the hub until its head $c^2$ is tightly seated within said socket. It is obvious that adjacent spokes may be thus entered in the hub at the same time. The innermost extremities of the spokes are tapered to permit their lying very close together near the center of the hub before they are forced out into their ultimate position.

The felly D is, as stated, of sectional construction, and is shown in Fig. 1 of the drawings as composed of a series of eight sections, one of which, $d$, is so tapered at its ends as to act as a key or wedge piece to the series. The outer extremities of the spokes are secured in the usual manner to the fellies, and each felly section is shown as engaged by two of the spokes.

E is the tire, the same being an annular band of metal provided at each lateral edge with a circumferential flange integral with its body, the said flanges extending in parallelism radially inward, and the dimensions of the whole being such that the breadth of the internal space between the two flanges is the same as, or slightly less than, the breadth of the felly.

In assembling the parts of the wheel, the body $a$ of the hub is placed in a position concentric with the tire,—the interior of which latter is preferably painted or coated with white lead or similar plastic filling serving as a preserving material,—and two spokes connected with the first felly section are entered in two of the hub sockets, while said section is set between the flanges of the tire. A second felly section is similarly set in position beside the first, and so on throughout the series, up to the last or key section $d$, which, as shown, is shorter as to its outer face than as to its inner, its ends being oblique so as to constitute it a wedge adapted as to its ends to register with the contiguous ends of the two adjacent sections which are correspondingly oppositely oblique, to the end that when said key section is set in position, it may be wedged into place to compact the entire series of the sections endwise against each other, and complete and fill the circle of the felly.

The bushing casting B hereinbefore referred to has a smooth bore for the reception of the axle spindle, but is externally tapered from its outer end to its central portion as shown in Fig. 3, so that when, to complete the wheel, the cap $a'$ is placed in position on the body $a$, said spindle casting may be introduced through the central apertures of the body and cap, and its gradually enlarging or tapering body may after the fashion of an inclined plane, encounter the inner ends of the spokes, and, by the action of the nut $b$, force them radially outward and thereby lock the felly sections firmly against the tire in the space between its flanges. The outer end of the casting B is of course threaded for the nut $b$, and the inner end formed with a head $b^\times$.

The filling material referred to, when placed inside the tire, fills any crevices or interspaces existing between the felly sections and said tire.

Having thus described my invention, I claim:

1. In a wheel, in combination with a series of spokes, a hub consisting of a body and a cap, one of which parts is provided with projections which extend between the spokes, and a bushing casting passing through said body and cap, which casting is externally in direct contact with the inner ends of the spokes, is between its end and central portion tapered as set forth, and is provided with an internal bore for the reception of the axle, substantially as set forth.

2. In a wheel, in combination with a series of spokes the inner ends of which are formed with necks and heads, a hub embodying spoke sockets through which said spokes extend, and means for forcing said spokes radially outward to seat their heads snugly within said sockets, substantially as set forth.

3. In a wheel, in combination with a series of spokes the inner ends of which are formed with necks and heads, a hub consisting of a body and a cap, one of which parts has rigid projections extending between the spokes, and means for forcing said spokes radially outward to seat their heads snugly against the rigid projections and the opposing edges of the hub body and cap, substantially as set forth.

In testimony that I claim the foregoing as my invention I have hereunto signed my name this 24th day of September A. D. 1891.

GEORGE G. WARD.

In presence of—
F. NORMAN DIXON,
R. M. RUSSELL.